Bowen & Foster,
Cider Mill.

No. 113,732. Patented Apr. 18, 1871.

Witnesses:
Joseph M. Skinner
Elijah Thompson

Inventors.
Jesse Bowen
Aaron T. Foster

UNITED STATES PATENT OFFICE.

JESSE BOWEN AND AARON T. FOSTER, OF CLARKSBURG, OHIO.

IMPROVEMENT IN CIDER-MILLS.

Specification forming part of Letters Patent No. 113,732, dated April 18, 1871.

We, JESSE BOWEN and AARON T. FOSTER, of Clarksburg, in the county of Ross and State of Ohio, have invented certain Improvements in Cider-Mills, of which the following is a specification:

Our invention relates to that class of cider-mills which is provided with revolving knives and scrapers for cutting and rasping the fruit; and consists in a drum, bearing upon its face alternate rows of peculiarly-constructed knives and scrapers, and in a fluted front board, in close proximity to the cutting and scraping drum of the machine; and also in a revolving armed compressor for compressing the fruit against the drum while in motion, to facilitate the operation of reducing the fruit to a pulp.

Figure 1:
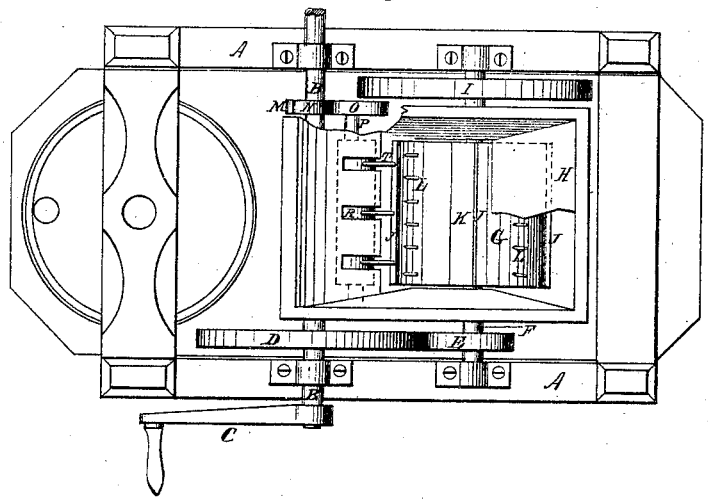
Figure 2:
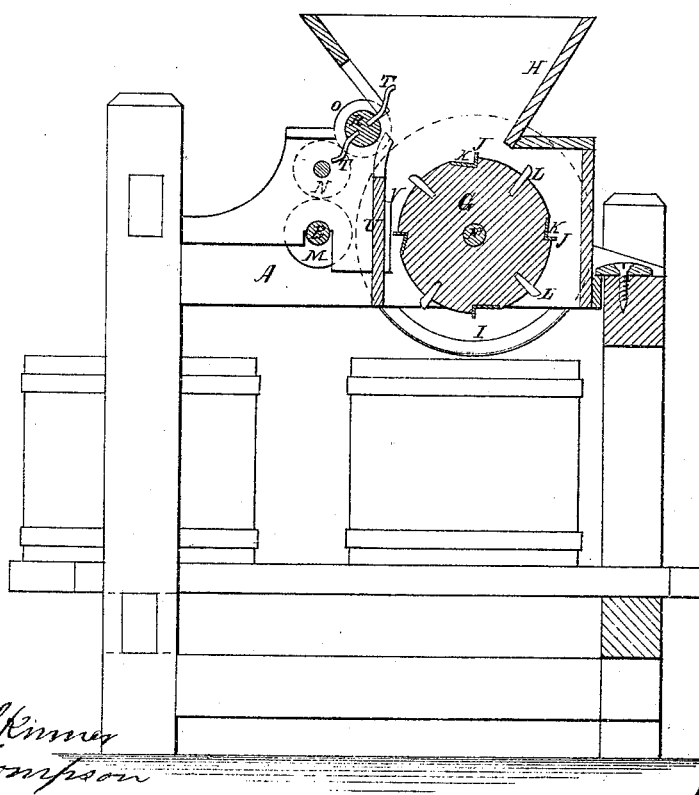
Figure 3:
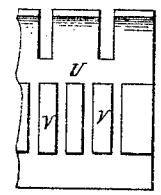

Figure 1 is a plan of a cider-mill embodying our improvements. Fig. 2 is a longitudinal vertical sectional elevation of the same. Fig. 3 is a detached view of the fluted front board.

A is the frame of the machine, to which the moving parts are attached. B is the driving-shaft, to which power is applied by means of the winch C. The large friction-wheel D on the driving-shaft B engages the friction-pulley E on the shaft F, which carries the drum G, located in the bottom of the hopper H. The shaft F also carries the fly-wheel I.

The drum G is provided with a number of ribs of angular form projecting above its surface. These ribs J extend longitudinally across the face of the drum. Immediately in front of them, toward the direction of rotation of the drum, are recesses or gutters K in the drum.

Series of knives L, projecting further above the surface of the drum than do the ribs J, are located in rows intermediate with the ribs J.

To the driving-shaft B is secured the friction-pulley M, which engages the "idler" N, which in turn engages the friction-pulley O secured to the end of the shaft P.

The drum R on the shaft P carries a series of curved arms, T, which, when the machine is in operation, enters and leaves the hopper above the drum G at the front of the machine, and over the front board U, which has a number of angular ribs, V, secured to its interior surface, so arranged that the knives on the drum G may pass between them.

The drum G is made of wood or other suitable material, and armed with series of knives which cut the fruit in parallel incisions and facilitate the rasping operations by the ribs J.

The arms T revolve much slower than does the drum G, which function being to insure the feeding down between the drum and the ribs V and front board U of the fruit, which, having been pressed down upon the top of the ribs J, is sliced and rasped by the quickly-rotating knives and ribs projecting from the surface of the drum. While the knives pass freely between the ribs V or flutings of the front board the ribs J rotate in close proximity thereto, effectually crushing all parts of the fruit, which, as pulp, falls into the compressing-tub below.

The grooves in the drum G in front of the ribs J receive that part of the pulp not immediately precipitated into the receptacle below, and is free to escape after the rasping is completed without wedging into a solid mass under the rasping-edges.

We claim as our invention—

1. The cutting and rasping drum G, provided with series of knives L and ribs or rasping-edges J, and grooves K, all being constructed and arranged substantially as and for the purposes shown and described.

2. The combination of the hopper H, revolving compressor R, having arms T, the drum G, front board U, shaft B, and friction-gears M N O, when said parts are constructed and arranged for operation substantially as shown and described.

JESSE BOWEN.
AARON T. FOSTER.

Witnesses:
JOSEPH M. SKINNER,
ELIJAH THOMPSON.